(12) United States Patent
Jeon

(10) Patent No.: US 6,935,752 B2
(45) Date of Patent: Aug. 30, 2005

(54) IMAGE PROJECTING APPARATUS

(75) Inventor: Kee-uk Jeon, Suwon (KR)

(73) Assignee: Samsung Electronics Co., Ltd., Gyunggi-do (KR)

(*) Notice: Subject to any disclaimer, the term of this patent is extended or adjusted under 35 U.S.C. 154(b) by 0 days.

(21) Appl. No.: 10/619,570

(22) Filed: Jul. 16, 2003

(65) Prior Publication Data

US 2005/0073654 A1 Apr. 7, 2005

(30) Foreign Application Priority Data

Jul. 16, 2002 (KR) ................................ 10-2002-0041519

(51) Int. Cl.⁷ ............................................. G03B 21/28
(52) U.S. Cl. .................................... 353/99; 348/771
(58) Field of Search .......................... 353/31, 81, 98; 348/742, 743, 771

(56) References Cited

U.S. PATENT DOCUMENTS

| | | | |
|---|---|---|---|
| 5,467,146 A | 11/1995 | Huang et al. | |
| 6,219,110 B1 | 4/2001 | Ishikawa et al. | |
| 6,357,878 B1 * | 3/2002 | Sawamura | 353/33 |
| 6,588,908 B2 * | 7/2003 | Shimizu | 353/81 |
| 6,715,880 B2 * | 4/2004 | Shouji | 353/20 |

FOREIGN PATENT DOCUMENTS

| | | |
|---|---|---|
| EP | 0 646 828 A1 | 4/1995 |
| JP | 2001-109062 | 4/2001 |
| WO | WO 01/33865 A1 | 5/2001 |

* cited by examiner

*Primary Examiner*—William C. Dowling
(74) *Attorney, Agent, or Firm*—Sughrue Mion, PLLC

(57) ABSTRACT

Disclosed is an image projecting apparatus having two reflective mirrors. In an image projecting apparatus which forms a desired image on a digital micromirror panel (DMD) by projecting a ray of light from a light source thereonto, the surface parallel with the longer side of the movable mirror surface of the DMD panel and vertical to the movable mirror surface is parallel with the optical axis of the light source. The first reflective mirror reflects the ray of light from the light source at a predetermined angle, and the second reflective mirror is arranged to reflect the reflective light from the first reflective mirror to fall incident on the movable mirror surface of the DMD panel. The distance from the center of the DMD panel to the optical axis is minimized, and as a result, the overall height of the image projecting apparatus is reduced.

5 Claims, 4 Drawing Sheets

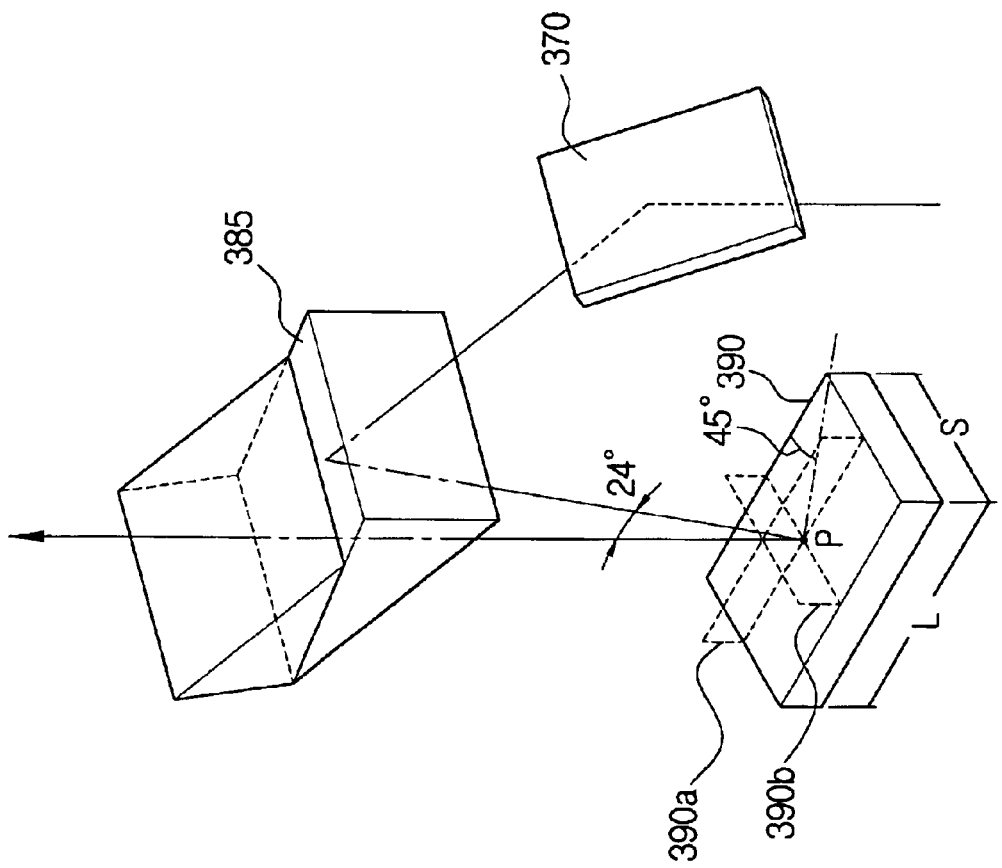

IMAGE PROJECTING APPARATUS

The present Application claims priority from Korean Patent Application No. 10-2002-0041519 filed in the Republic of Korea on July 16, 2002, which Korean application is incorporated in full herein by reference.

FIELD OF THE INVENTION

The present invention relates to an image projecting apparatus, and more particularly, to an image projecting apparatus having a plurality of reflective mirrors to vary an optical path, and thus requires less space in height for the body thereof where necessary parts are arranged.

DESCRIPTION OF THE RELATED ART

Following an ever-increasing demand for a large screen with high picture quality, the supply of image projecting apparatus has been increasing. The image projecting apparatus uses a projection lens to magnify a small image and then projects it in a large image. Generally, the image projecting apparatus is categorized into front projection apparatus and rear projection apparatus.

The front projection apparatus projects image signals from the front of the screen, and is usually used in the theaters and presentation rooms. The rear projection apparatus projects image signals from the rear of the screen, and is widely used in projection TV applications. The rear projection apparatus is more widely used than the front projection apparatus because it can display bright images even in a relatively bright environment.

FIG. 1 is a view showing a rear projection TV having a conventional image projecting apparatus.

Referring to FIG. 1, the rear projection TV 100 has an upper portion and a lower portion. On the upper portion is formed a screen through which a viewer watches images. Inside the lower portion of the rear projection TV 100, an image projecting apparatus (not shown) is provided to project images onto the screen.

FIG. 2 is a view showing the conventional image projecting apparatus of FIG. 1.

Referring to FIG. 2, the image projecting apparatus 200 includes a light source 210, a color filter wheel 220, a square beam generator 230, a first lens group 240, a reflective mirror 250, a second lens group 260, a prism 270 and a digital micromirror device (DMD) 280.

The light source 210 irradiates white light using a halogen or xenon light. The white light, which is emitted from the light source 210, is divided into R, G and B monochromatic rays through the R, G and B regions of the color filter wheel 220. The square beam generator 230 transforms the monochromatic rays from the color filter wheel 220 into square beams, respectively.

The reflective mirror 250 total-reflects a monochromatic ray which is collimated through the first lens group 240, The second lens group 260 is for collimating the total-reflected monochromatic ray towards the prism 270, and thus, the monochromatic ray is reflected toward a movable mirror surface of the DMD panel 280 upon being incident on the prism 270. The monochromatic ray is then converted into an image through the mirrors on the movable mirror surface, transmitted through the prism 270, incident on the projection lens system (not shown), and finally realized on the screen of FIG. 1 in a predetermined image.

It is assumed that an imaginary surface 280a of infinite size is formed on the movable mirror surface in a vertical direction, and in parallel relation with respect to the longer side L of the movable mirror surface and passing through a centerline (p) of the movable mirror surface. Since the vertical distance (h) from the imaginary surface 280a to the optical axis of the light source 210 is long, the height H of the conventional image projecting apparatus 200 needs to be increased, and the height of the lower portion of the rear projection TV 100 is also increased. As a result, a compact-sized rear projection TV is not achieved.

SUMMARY OF THE INVENTION

Accordingly, it is an aspect of the present invention to provide an image projecting apparatus that uses a reflective mirror to vary a length of an optical path and thus require less space in height.

In order to achieve the above-noted aspects and/or features of the present invention and other objects and features of the present invention, an image projecting apparatus forming an image by projecting a light irradiated from a light source onto a digital micromirror panel, includes the digital micromirror panel configured such that a normal plane of a movable mirror surface of the digital micromirror panel, which is parallel with a longer side of the movable mirror surface, is parallel with an optical axis of the light source, a first reflective mirror configured to reflect the light from the light source at a predetermined angle, and a second reflective mirror configured to receive the light reflected from the first reflective mirror and to reflect the light onto the movable mirror surface of the digital micromirror panel.

The first and the second reflective mirrors are configured such that an optical path of the light from the light source does not cross the normal plane of the digital micromirror panel until the light is incident on the movable mirror surface.

The second reflective mirror is configured such that the light from the first reflective mirror is reflected from the second reflective mirror to be incident on the movable mirror surface of the digital micromirror panel. Here, an angle between the normal line of the movable surface and the incident light is two times greater than the angle at which the digital micromirror is tilted, and an angle between the orthographic projective line of the incident light and the longer side of the movable mirror surface is 40°–50°.

Further provided are a first lens group provided with at least one lens, having a positive refractivity, being disposed on the optical path between the light source and the first reflective mirror, and a second lens group provided with at least one lens, having a positive refractivity, being disposed on the optical path between the second reflective mirror and the digital micromirror panel.

BRIEF DESCRIPTION OF THE DRAWINGS

The above objects and other features of the present invention will become more apparent by describing in detail a preferred embodiment thereof with reference to the attached drawings, in which:

FIG. 4 is a perspective view of a second reflective mirror, a prism and a DMD panel, for illustrating an arrangement of the second reflective mirror and the DMD panel of FIG. 3.

DETAILED DESCRIPTION OF THE PREFERRED EMBODIMENT

Hereinafter, the present invention will be described in detail with reference to the accompanying drawings.

Figure 1:
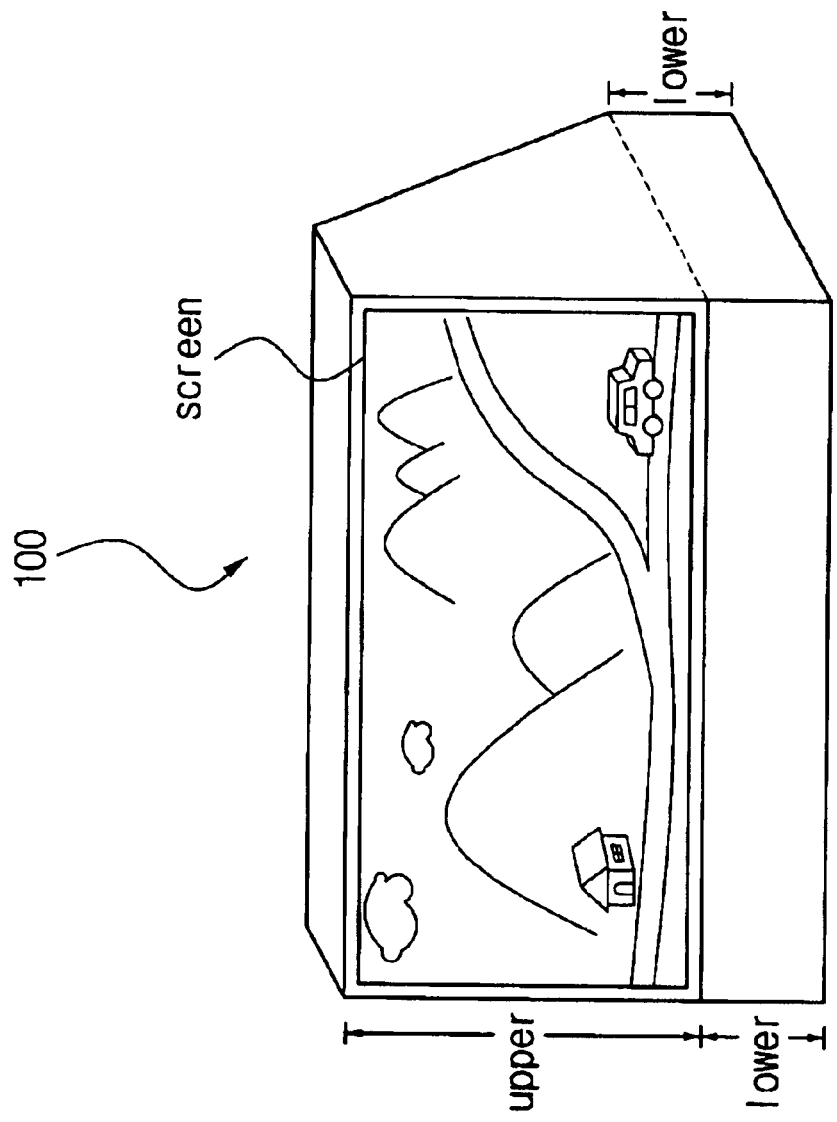
FIG. 1 is a view showing a rear projection TV having a conventional image projecting apparatus.
Figure 2:
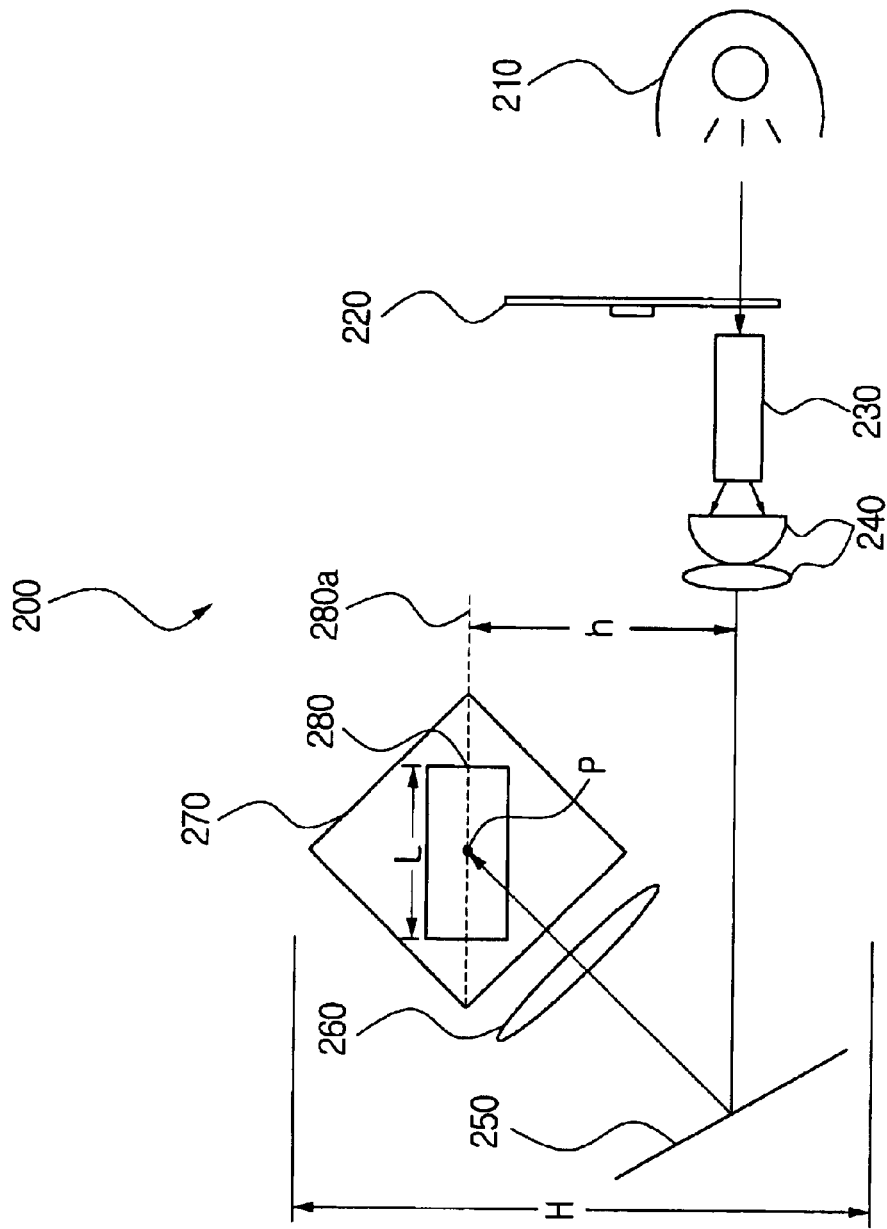
FIG. 2 is a view showing the conventional rear image projecting apparatus of FIG. 1.
Figure 3:
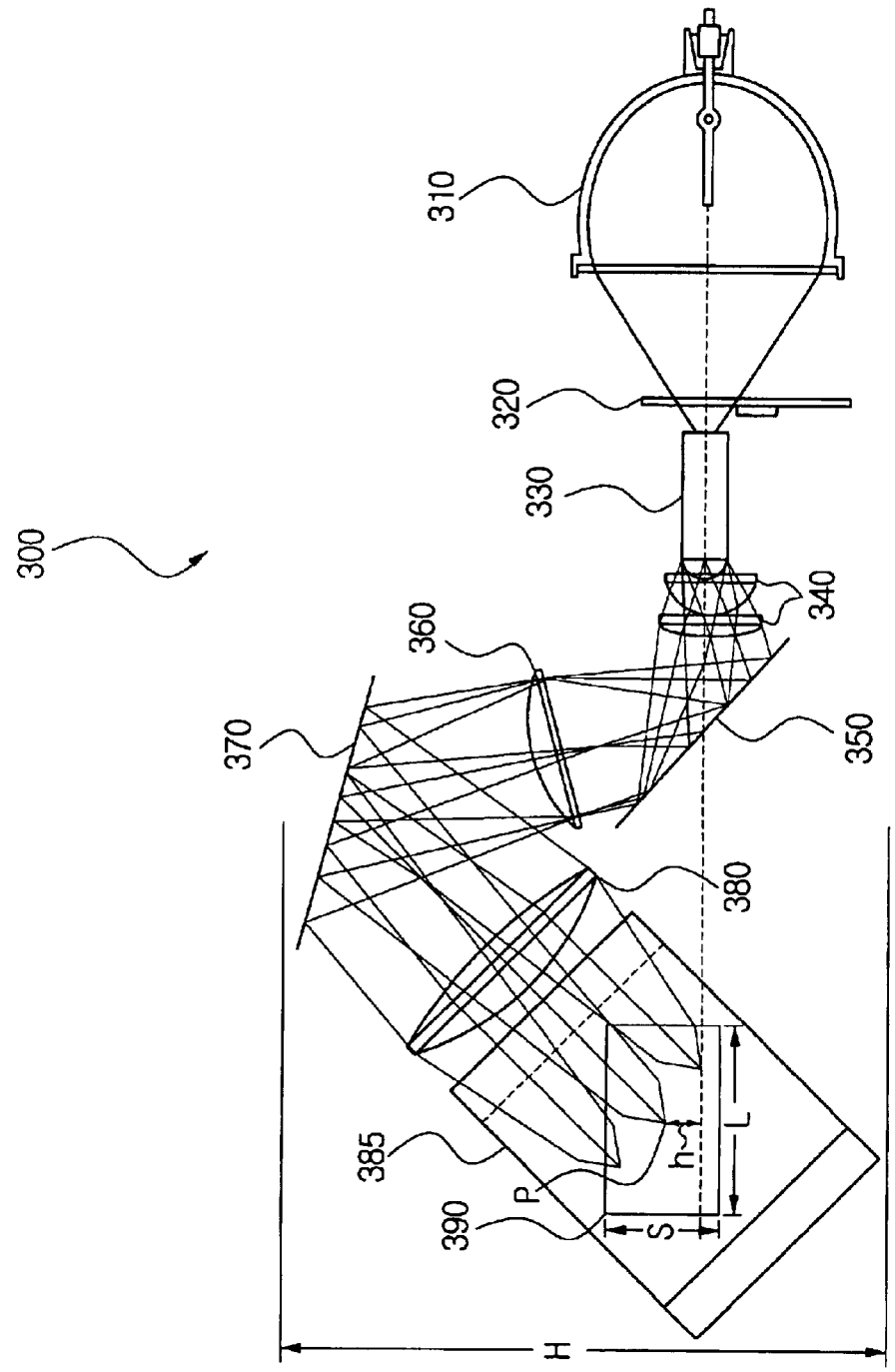
FIG. 3 is a view showing an image projecting apparatus according to a preferred embodiment of the present invention.

FIG. 3 is a view showing an image projecting apparatus according to a preferred embodiment of the present invention.

Referring to FIG. 3, the image projecting apparatus 300 according to the present invention includes a light source 310, a color filter wheel 320, a square beam generator 330, a first lens group 340, a first reflective mirror 350, a second lens group 360, a second reflective mirror 370, a third lens group 380, a prism 385, a digital micromirror device (DMD) panel 390 and a projection lens system (not shown).

The light source 310 irradiates a white light, which is a mixture of plural monochromatic lights, for example, red (R), green (G) and blue (B) monochromatic lights. As for the light source 310, a laser, a mercury lamp, a metal halide lamp, a halogen lamp and xenon lamp may be used.

The color filter wheel 320 is divided into red, green and blue regions, and is rotated by a rotating means (not shown). The white light, being irradiated from the light source 310, is divided into R, G and B monochromatic rays through R, G and B regions of the color filter wheel 320. The R, G and B regions of the color filter wheel 320 are rotated at certain time interval and in accordance with the properties of each monochromatic light to permit each corresponding light to pass therethrough.

The square beam generator 330 transforms the monochromatic lights passing through the color filter wheel 320 into square beams of predetermined aspect ratio. To this end, the square beam generator 330 uses a light tunnel or glass rod (not shown). The light tunnel is a hollow hexahedron, with four inner sides being made of mirrors. After having passed through the color filter wheel 320, the R, G and B monochromatic lights are transformed into square beams in the light tunnel, and then emitted. Accordingly, a light beam is incident on the DMD panel 390 with uniform light intensity. The predetermined aspect ratio of the light tunnel is similar, or identical to that of the DMD panel 390. Unlike the light tunnel, the glass rod (not shown) has no space defined therein, and the R, G and B monochromatic rays are emerged from the glass rod (not shown) by total reflection.

The first lens group 340 is provided with at least one lens, and has a positive refractive power for the square beam of monochromatic light to be incident on the first reflective mirror 350. The first reflective mirror 350 reflects the incident monochromatic lights from the first lens group 340 at a predetermined angle.

The second lens group 360 is provided with at least one lens, for causing the reflective monochromatic light from the first reflective mirror 350 to fall incident on the second reflective mirror 370. Use of the second lens group 360 is optional, and accordingly, the second lens group 360 may be omitted.

The second reflective mirror 370 is arranged such that its reflective surface faces the reflective surface of the first reflective mirror 350, thus to reflect the incident monochromatic light from the second lens group 360 to be incident on the movable mirror surface of the DMD panel 390. The sloping degree of the first and the second reflective mirrors 350, 370 may be different, or identical.

Provided between the second reflective mirror 370 and the DMD panel 390 are the third lens group 380 and the prism 385. The third lens group 380 causes the reflected monochromatic light from the second reflective mirror 370 into the prism 385. The third lens group 380 is provided with at least one lens, and has a positive refractivity.

The prism 385 is a TIR (total internal reflection) prism, and FIG. 3 shows the light incident side of the TIR prism 385. The prism 385 is provided for total-reflection of the monochromatic lights, which are passed through the third lens group 380, so that the monochromatic lights fall incident on the movable mirror surface of the DMD panel 390.

The movable mirror surface of the DMD panel 390 is a square panel having, in a predetermined aspect ratio, a longer side L parallel to the lower side where the image projecting apparatus 300 is provided, and a shorter side S which is perpendicular to the lower side. The predetermined aspect ratio of the DMD panel 390 may be similar to, or identical with that of the screen (not shown) of the projection TV.

The movable mirror surface of the DMD panel 390 is arranged in parallel relation with respect to the optical axis (in dotted line) of the light source 310. In other words, the DMD panel 390 is arranged such that the normal plane of the DMD panel 390, which is parallel with the longer side L of the movable mirror surface is parallel with the optical axis of the light source 310. The DMD panel 390 is also arranged such that the square beams passed through the square beam generator 330 are incident on the corresponding part of the movable mirror surface. For example, a particular portion of the opening of the square beam generator 330 emitting the light would correspond to a part of the movable mirror surface on which the light is incident.

The image, being converted at the movable mirror surface of the DMD panel 390, is passed back through the prism 385 and then incident on the projection lens system (not shown). The projection lens system enlarges the converted image from the movable mirror surface to a predetermined aspect ratio, and projects the enlarged image onto the screen. It is preferred that an angle between the normal line of the movable mirror surface and the center incident ray be 1.5~2.5 times greater than the angle at which the DMD panel 390 is tilted, which is, for example, 12°. This is because each micromirror (not shown) reflects corresponding monochromatic rays while being driven within the tilting angle ranging from +12° to −12°.

For example, when a ray is incident onto the +12° slanted micromirror (not shown) at an angle of 24° with respect to the normal line of the micromirror (not shown), the incident ray is 'on', thus being transmitted through the prism 385 and then incident on the projection lens system (not shown). On the other hand, when a ray is incident onto the −12° slanted micromirror (not shown) at an angle of 24° with respect to the normal line of the micromirror (not shown), the incident ray is 'off', thus not being incident onto the projection lens system (not shown). The above is in consideration of the characteristics of general TIR prism and the DMD panel 390, and because it is well known in the art, detailed description thereof will be omitted.

FIG. 4 is a perspective view of the second reflective mirror, the prism and the DMD panel, for illustrating an arrangement of the second reflective mirror and the DMD panel of FIG. 3.

Referring to FIG. 4, the angle between the normal line of the movable mirror surface and the center incident ray (shown in one-dotted line) is approximately 24°, i.e., two times greater than the tilting angle, approximately 12°, of the DMD panel 390, and the angle between the orthographic projective line (two-dotted line) of the incident ray which is entering approximately at 24° and the longer side L of the movable mirror surface is approximately 45°.

Describing the above in greater detail, as the light is irradiated from the light source 310, reflected at the first and the second reflective mirrors 350, 370 and then falls incident onto the centerline p of the movable mirror surface, the orthographic projective line on the movable mirror surface of the center incident ray is at an angle approximately of 45° with respect to the longer side L of the movable mirror surface, while the orthographic projective line of the marginal rays of light other than the center ray is incident at an angle deviated from the angle 45° to some extent, i.e., incident at an angle from about 30° to about 60°. What is more preferred is that the orthographic projective lines of the incident chief rays other than the center incident ray are also incident at an angle approximately of 45°.

Further, when it is assumed that there is a first imaginary surface 390*a* of an infinite size formed on the movable mirror surface in perpendicular relation, and in parallel relation with respect to the longer side L of the movable mirror surface of the DMD panel 390 and passing through the center (p) of the movable mirror surface, and a second imaginary surface 390*b* of an infinite size formed on the movable mirror surface in a perpendicular relation, and in parallel relation with respect to the shorter side S of the movable mirror surface of the DMD panel 390 and passing through the centerline (p) of the movable mirror surface, the first and the second reflective mirror 350, 370 are arranged such that the monochromatic light does not cross the second imaginary surface 390*b* of the movable mirror surface until the light, which is irradiated from the light source 310 along the respective optical paths, is incident on the movable mirror surface of the DMD panel 390. As a result, the optical path is tilted to a certain side in the internal structure of the image projecting apparatus 300. Further, the first and the second reflective mirrors 350, 370 are arranged such that the normal plane of the movable mirror surface, which is parallel with the longer side L of the movable mirror surface, is parallel with the optical axis of the light source 310.

Further, the first and the second reflective mirrors 350, 370 are arranged to face each other such that the optical axis is parallel with the first imaginary surface 390*a*.

By arranging the respective parts of the image projecting apparatus 300 to meet the above-described conditions, the distance (h) from the center (p) of the imaginary mirror surface of the DMD panel 390 to the optical axis (in dotted line) of the light source 310 is minimized, and thus, the height H of the image projecting apparatus 300 is reduced.

With the image projecting apparatus according to the present invention, through the use of two reflective opposite mirrors and a lens, the vertical height of the image projecting apparatus can be minimized. In other words, since the optical path is varied by using the two reflective mirrors, and the distance from the center of the DMD panel to the optical axis is minimized, the vertical height of the image projecting apparatus is also reduced. As the lower portion, where the image projecting apparatus is provided, is reduced in height, a projection TV can be compact-sized.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. An image projecting apparatus forming an image by projecting a light irradiated from a light source onto a digital micromirror panel, comprising:

the digital micromirror panel configured such that a normal plane of a movable mirror surface of the digital micromirror panel, which is parallel with a longer side of the movable mirror surface, is parallel with an optical axis of the light source;

a first reflective mirror configured to reflect the light from the light source at a predetermined angle; and a second reflective mirror configured to receive the light reflected from the first reflective mirror and to reflect the light onto the movable mirror surface of the digital micromirror panel, wherein the second reflective mirror is configured such that the light from the first reflective mirror is reflected from the second reflective mirror to be incident on the movable mirror surface of the digital micromirror panel, with an angle between the normal plane of the movable surface and the incident light being 1.5~2.5 times greater than the angle at which the digital micromirror is tilted, and also with an angle between the orthographic projective line of the incident light and the longer side of the movable mirror surface being 40°–50°.

2. The image projecting apparatus of claim 1, further comprising a first lens group provided with at least one lens, having a positive refractivity, and disposed on the optical path between the light source and the first reflective mirror; and a second lens group provided with at least one lens, having a positive refractivity, and disposed on the optical path between the second reflective mirror and the digital micromirror panel.

3. The image projecting apparatus of claim 2, further comprising a third lens group provided with at least one lens, having a positive refractivity, and disposed on the optical path between the first reflective mirror and the second reflective mirror.

4. The image projecting apparatus of claim 1, further comprising a prism system, wherein the light reflected onto the movable mirror surface of the digital micromirror panel by the second reflective mirror is also reflected by the prism.

5. The image projecting apparatus of claim 4, wherein the prism is a total internal reflection prism.

* * * * *